Nov. 15, 1966 A. LANGNER 3,285,385
TRANSLOADING DEVICE
Filed Oct. 22, 1964 6 Sheets-Sheet 2
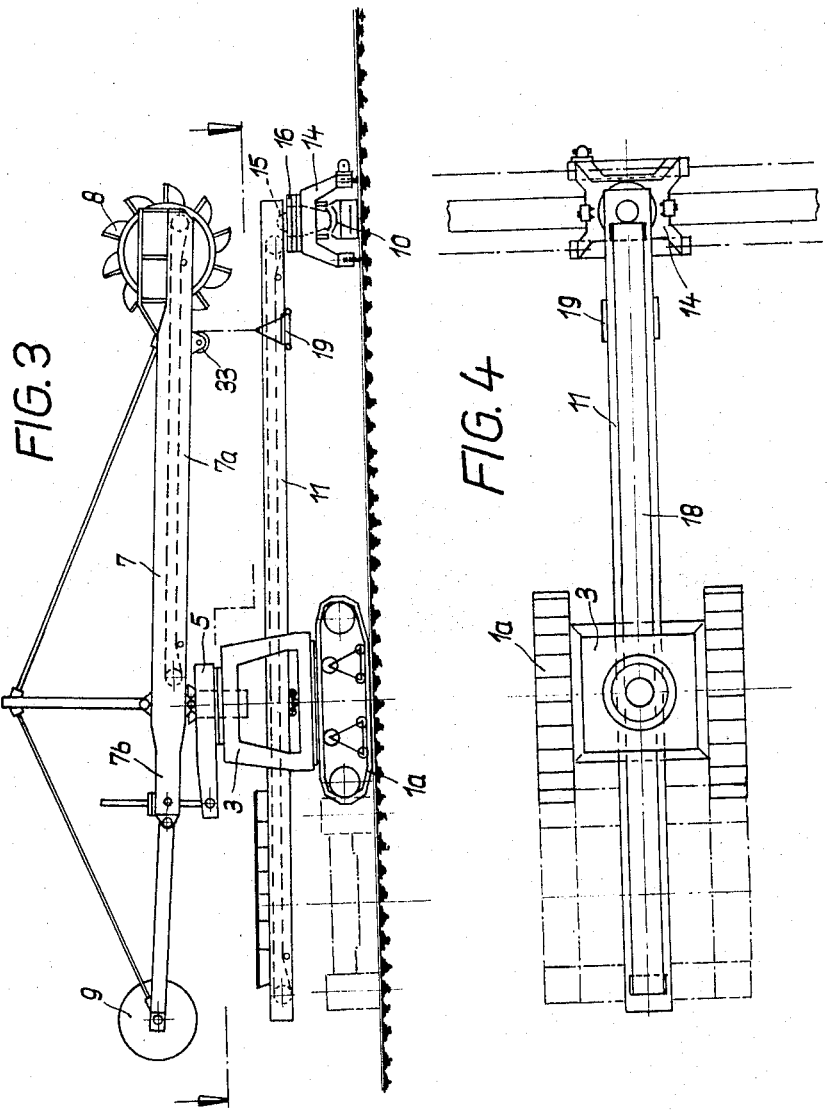
Inventor:
Alexander Langner
By

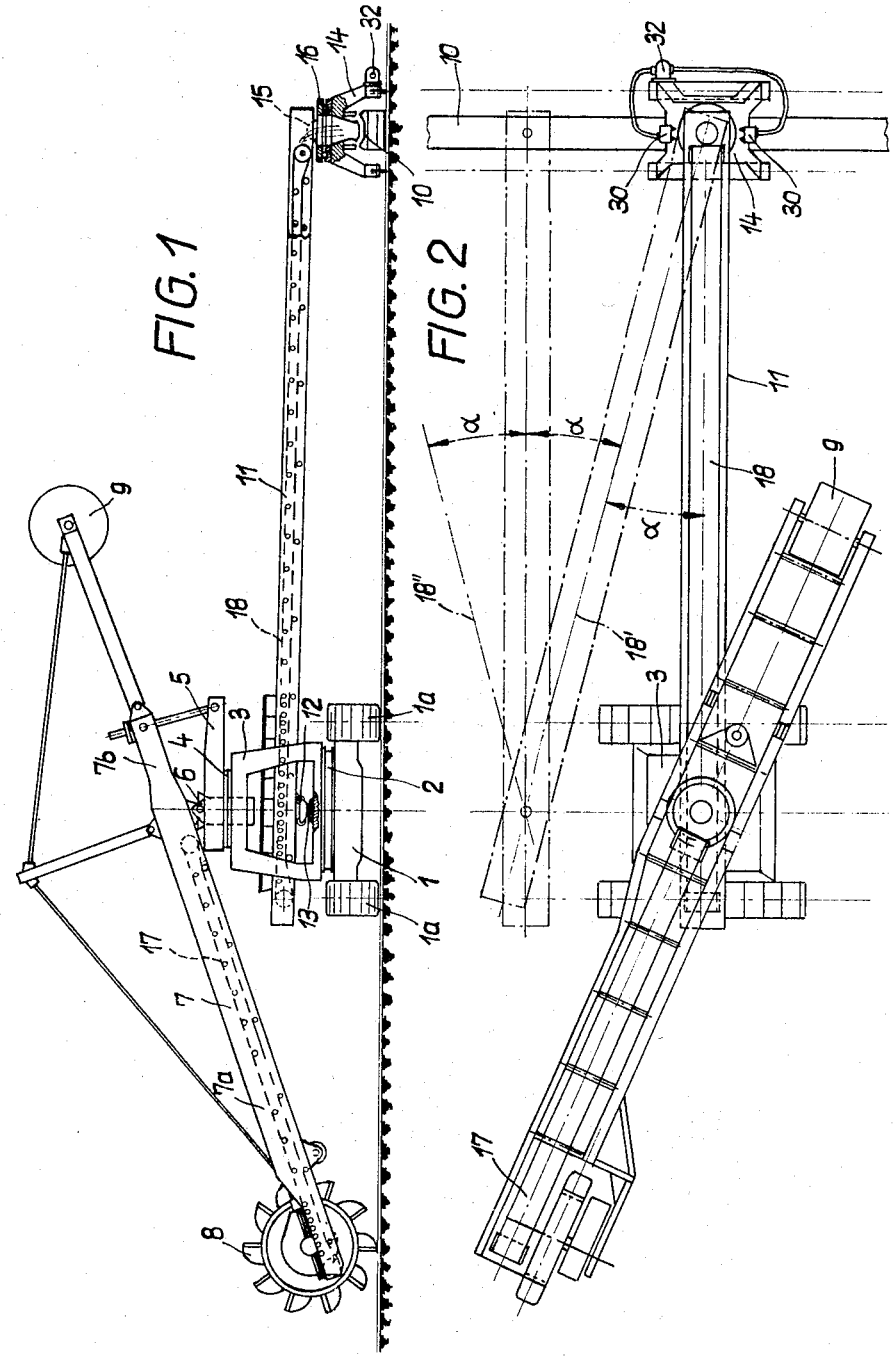

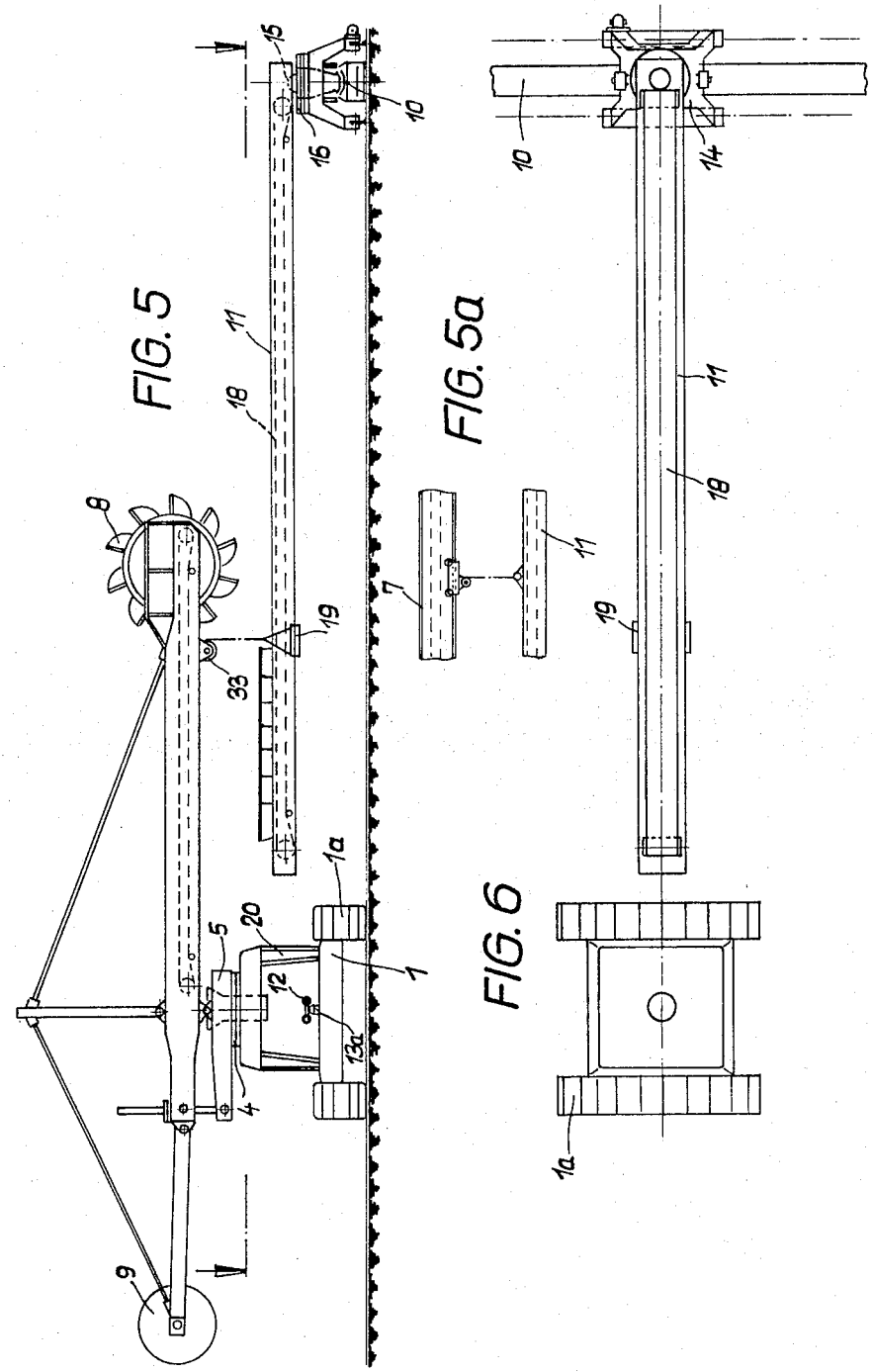

Nov. 15, 1966  A. LANGNER  3,285,385
TRANSLOADING DEVICE
Filed Oct. 22, 1964  6 Sheets-Sheet 4
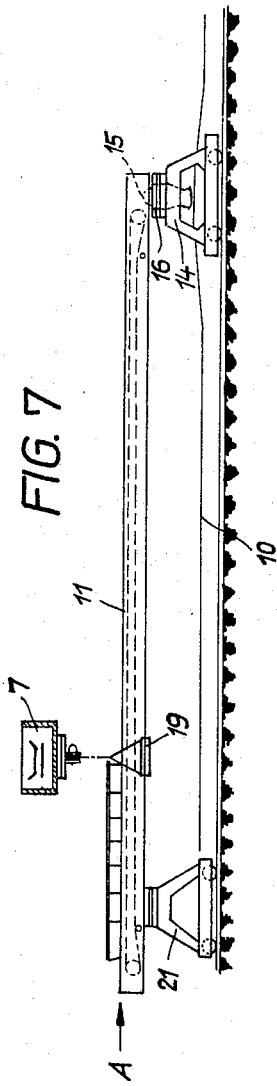
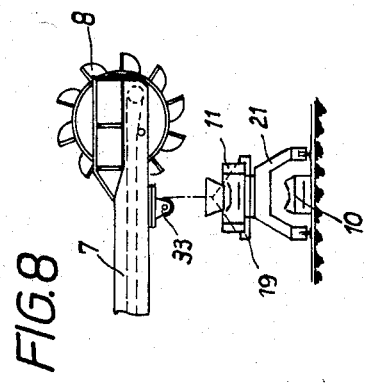
Inventor:
Alexander Langner
By

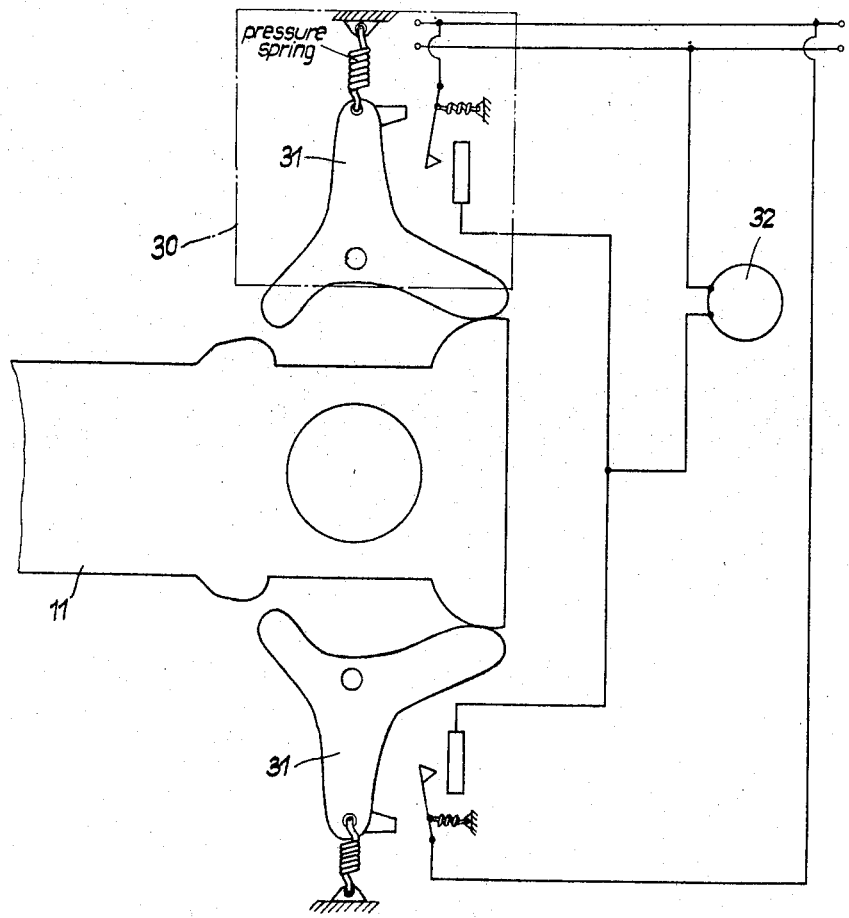

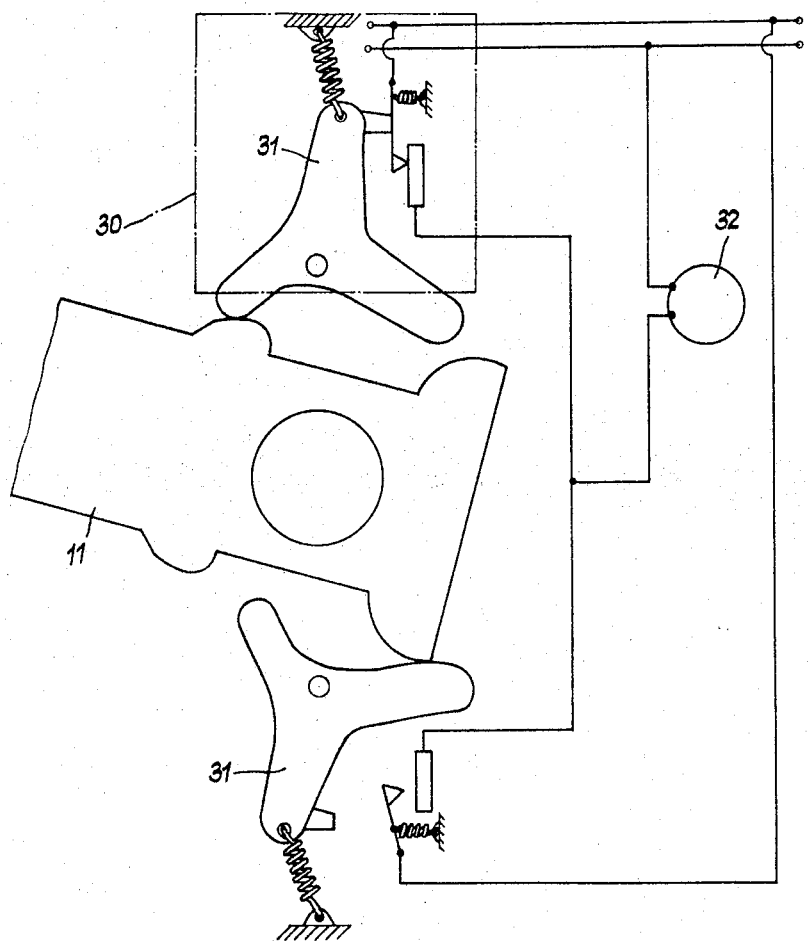

United States Patent Office 3,285,385
Patented Nov. 15, 1966

3,285,385
TRANSLOADING DEVICE
Alexander Langner, Rheinhausen, Germany, assignor to Beteiligungs- und Patentverwaltungsgesellschaft mit beschränkter Haftung, Essen, Germany
Filed Oct. 22, 1964, Ser. No. 405,791
Claims priority, application Germany, Oct. 25, 1963, B 74,012
8 Claims. (Cl. 198—9)

The present invention relates to an arrangement for picking up and conveying pourable material from a storage place. More specifically, the invention relates to a device of the above-mentioned character which comprises a movable loader, a conveyor belt, and a conveyor belt bridge which on one hand is longitudinally displaceably mounted within an opening of the loader frame, and on the other hand rests on a charging carriage which is movable over the conveyor belt.

An arrangement of this type is known where the loader, and more specifically a bucket wheel loader is displaceable on rails which extend parallel to the conveyor belt.

It is an object of this invention to provide an arrangement of the above-mentioned general type which will make it possible, without limiting the loader to rails, to carry out various conveying operations, also when pourable goods having different properties are distributed over a rather large storage place.

It is another object of this invention to provide a loader as set forth in the preceding paragraph which can quickly and easily be moved from one section of a storage place to another section regardless of its distance.

These and other objects and advantages of the invention will appear more clearly from the following specification in connection with the accompanying drawings, in which:

FIGURE 1 diagrammatically illustrates a side view of a first embodiment of an arrangement according to the present invention which comprises a bucket wheel loader, a conveyor belt and a conveyor belt bridge, said arrangement being shown in its working position;

FIGURE 2 is a top view of FIGURE 1 while some parts have been omitted;

FIGURE 3 diagrammatically illustrates the arrangement of FIGURES 1 and 2 but in a transition stage for changing its location;

FIGURE 4 is a top view of FIGURE 3 while certain parts have been omitted;

FIGURE 5 represents a diagrammatic illustration of a second embodiment of an arrangement according to the present invention which comprises a bucket wheel loader, a conveyor belt and a conveyor belt bridge, the arrangement being in a transition stage for changing its location;

FIGURE 5a shows a modification of a detail of FIGURE 5 and more specifically shows the conveyor belt bridge supported by a trolley;

FIGURE 6 is a top view of FIGURE 5 while certain parts have been omitted;

FIGURE 7 is a side view of a portion of a conveyor belt together with a conveyor bridge movable over said conveyor;

FIGURE 8 is an end view of FIGURE 7 as seen in the direction of the arrow A.

FIGURES 9 and 10 show diagrammatically limit switches.

The present invention is characterized primarily in that for driving the charging carriage by a motor, there is provided a control device which includes a limit switch adapted automatically to bring about a follow-up movement of the loading carriage relative to the loader when the latter advances on caterpillar tracks or wheels substantially parallel to the conveyor belt and during this movement, the angle between the conveyor belt bridge and the conveyor belt decreases to a certain acute angle.

With a device of this type, the loader may be so designed that its frame which carries the turning means for the boom carrying the pick-up means, is by means of a turntable journalled on the under-structure of the loader, which latter forms a part of a two-caterpillar track carriage and is adapted to rotate on the spot. The conveyor belt bridge which in an opening of the loader framework is displaceable over a distance of at least one-third of the length of the conveyor belt bridge, is adapted to be suspended on the boom carrying the pick-up means or on the boom carrying a counterweight, through the intervention of a trolley displaceable on the boom or through the intervention of a roller bed suspended on the boom. In this way, the requirement is met that the loader can quickly be moved from one place to another. To meet this requirement is particularly difficult when the loading frame, for purposes of saving a lower turntable, is non-rotatably arranged on the loader under-structure, while the conveyor belt bridge can only to a limited extent be turned laterally within the opening of the frame. It will be appreciated that in such an instance the belt bridge which extends transversely to the driving direction of the loader would be a handicap when the loader, for purposes of changing its location, has to be moved on the storage place through relatively narrow lanes between piles of pourable goods. In such an instance, it is suggested, according to the present invention, that above the conveyor belt there is movably arranged a second supporting carriage on which that end of the conveyor belt bridge which faces the loader may be supported after the said end has been withdrawn from the opening of the frame structure. In this instance, the conveyor belt bridge may temporarily be suspended on the laterally movable boom carrying the pick-up means or on the respective boom carrying the counterweight. This may be effected through the intervention of a control displaceable on the boom or by a roller table suspended on the boom.

Referring now to the drawings in detail and FIGS. 1 to 4 thereof in particular, the bucket wheel loader shown therein has an under-structure 1 which is designed as a two-caterpillar track carriage. An intermediate structure 3 is by means of a turntable 2 supported by said under-structure 1. The intermediate structure 3, through the intervention of a turntable 4, carries an upper structure 5 having a rocker 7 journalled in two joints 6, the axes of said joints being substantially horizontal and in alignment with each other. One leg 7a of the rocker 7 carries a bucket wheel 8, whereas the other arm 7b of said rocker carries a counterweight 9. With the conveying operation as shown in FIGS. 1 and 2, the driving direction of the loader is substantially parallel to the conveyor belt 10. The spacing of the loader from said conveyor belt 10 is bridged by a conveyor belt bridge 11 which extends through two openings in the hollow intermediate frame structure 3. The said conveyor belt bridge 11 is longitudinally displaceable on a roller bed 12 in said intermediate structure 3, said roller bed 12 being supported by a ball joint 13.

The conveyor belt bridge 11 is furthermore supported by a charging carriage 14 extending over the conveyor belt 10. This is effected by means of two bearings or pivots 15 the axes of which are in alignment with each other and extend transversely with regard to the longitudinal extension of said conveyor belt bridge. Furthermore, there is provided a turntable 16 which carries bearings or pivots 15. Conveyor belt bridge 11 is thus supported at two points on carriage 14 and is furthermore supported at one point on the loader.

The goods picked up by the bucket wheel 8 are by means of a conveyor belt 17 on rocker 7 moved to the turning center of the loader and are, through the turntable 4, deposited upon conveyor belt 18 on bridge 11. From here, the goods are conveyed through turntable 16 onto conveyor belt 10. The distance between the loader and the conveyor belt 10 may be varied within wide limits in conformity with the displaceability in longitudinal direction of bridge 11 in intermediate structure 3.

When the loader moves parallel to conveyor belt 10, the bridge or bridge girder 11 with belt 18 will, as long as carriage 14 does not move, be turned from the position shown in solid lines in FIG. 2 by about 15°. The new position of belt 18 is indicated in FIG. 2 by the dot-dash line 18′ which forms an acute angle α with the longitudinal axis of the conveyor belt 10 in the starting position thereof. When this new position has been reached, a limit switch 30 (FIGS. 2, 9 and 10) on carriage 14 is actuated, and as a result thereof, by means of a control device 31, a drive motor 32 for the carriage is switched on. As a result thereof, the carriage 14 moves in the same direction as the loader but at a somewhat higher speed, so that belt 18 will after a certain time again occupy its original relative position with regard to conveyor belt 10, i.e., perpendicular to belt 10. In this position, for instance, the drive motor for the carriage is switched off (FIG. 9). However, it is also possible that the drive motor is switched off only when the belt bridge 11 with belt 18 has been turned by a further angle α (of approximately 15°) into the position indicated in FIG. 2 by dot-dash line 18″.

The operation is, of course, analogous when the loader is moved in the opposite direction. It will be appreciated that in this way it has been made possible that the transfer of the goods from the moving loader to the conveyor belt may be effected under all occurring circumstances.

If it is intended to move the bucket wheel loader to a more remote section of the storage place, the under-structure 1 of the loader is turned on the spot by 90° as indicated by dash-lines in FIG. 4. In this instance, the belt bridge 11 and the intermediate structure 3 retain their original position because the turntable 2 permits a corresponding relative rotation between the under-structure 1 and the intermediate structure 3. Thereupon, the loader is moved into the position of FIGS. 3 and 4 as indicated in full-lines, in which position belt bridge 11 will in driving direction protrude at both sides from the intermediate structure 3. Rocker 7 is turned on turntable 4 likewise in driving direction while arm 7a carrying the bucket wheel 8 is directed toward the conveyor belt 10. The respective part of conveyor belt bridge 11 is then supported by a roller table 19 which is suspended on rocker 7 at some distance from the turning center.

Thereupon, by means of a lifting device 33, which may be combined with the suspending means of the roller table 19, one end of the conveyor belt bridge 11 is lifted off the carriage 14 after the joints 15 have been disconnected. It will be appreciated that now the loader, together with the belt bridge 11 may be moved in a direction parallel to the conveyor belt 10 and along the latter to the new place of employment. Inasmuch as the conveyor belt bridge 11 extends in driving direction, the loader will be able in an unimpeded manner to move through narrow lanes between piles of pourable goods and the conveyor belt.

However, it is also possible, when intending a displacement of the bucket wheel loader, to keep the conveyor belt bridge 11 supported by the charging carriage 14 and to move the loader close to the conveyor belt 10. In this instance, the belt bridge 11 forms a very small acute angle with the conveyor belt 10 and will drag therebehind the carriage 14 when the loader moves along the conveyor belt. If desired, it is, of course, also possible to provide carriage 14 with a driving motor of its own.

In contradistinction of FIG. 3, the belt bridge 11 may also be suspended on a trolley movable on rocker 7.

As will be evident from the above, with the embodiment of FIGS. 1 to 4, the change of location of the loader is effected without the necessity of interrupting current feeding conductors to drives for the belt 18 on bridge 11.

Referring now to another embodiment of the invention as illustrated in FIG. 5, the frame portion which supports the conveyor belt bridge 11 is non-rotatably journalled relative to the carriage under-structure 1. Consequently, the lower turntable 2 of the first embodiment is lacking in the embodiment of FIG. 5. According to FIG. 5, a support 20 is connected to the under-structure 1, which support carries the turntable 4 for the upper structure 5. Conveyor belt bridge 11 is during a conveying operation passed through two openings of support 20 and, similar to the first embodiment, rests within the frame on a roller bed 12 which in turn rests on the under-structure 1 by a ball joint 13a. Within the said openings, the conveyor belt bridge 11 has so much play that the conveyor belt bridge 11 can be turned in either direction by an angle of approximately 15°. When such turning movements have been effected, similarly to the first embodiment, a control device is actuated which brings about a follow-up movement of the charging carriage 14. The respective limit switches arranged for this purpose may also be so arranged that the control will be effected in conformity with the relative position between the conveyor belt bridge 11 and frame 20.

When it is desired to move the buckt wheel loader of FIG. 5 to another further remote section of the storage place, the distance of the loader from the conveyor belt 10 will be increased by moving back and forth and by correspondingly guiding the loader. Prior thereto, the belt bridge 11 has been suspended on the boom 7a of the bucket wheel which boom has been turned parallel to the belt bridge 11. This suspension is effected by means of a roller table 19 which is suspended on the rocker 7 at a distance from the turning center of the loader. According to a modification, bridge 11 may also be suspended on a trolley which is movable on a track on rocker 7. This last-mentioned suspension is shown in FIG. 5a.

The belt bridge 11 is adapted by means of the above-mentioned maneuvering of the loader to be pulled out from support 20 while said belt bridge 11 is suspended on rocker 7 (see FIGS. 5 and 6).

The loader is then along an arc moved toward the conveyor belt 10 to such an extent that by means of rocker 7, belt bridge 11 can be deposited on a second supporting carriage 21 bridging the conveyor belt 10.

After the suspension connection between bridge 11 and rocker 7 has been disconnected and if necessary, the electric feeding line to the driving motor for belt 18 has been disengaged, the bucket wheel loader is moved to its new place of employment and is able to pass through narrow lanes between piles of pourable goods on the storage place. Bridge 11 will be moved on carriages 14 and 21 to the new place of employment where it will again be connected to the loader.

It is, of course, to be understood, that the present invention is, by no means, limited to the particular constructions and arrangements shown in the drawings, but also comprises any modifications within the scope of the appended claims.

What I claim is:

1. In an arrangement for picking up pourable material from a storage place and conveying the picked-up material: a movable loader including first conveying means and pick-up means at one portion of said conveying means and also including movable carriage means having frame means supporting said first conveying means, first turntable means interposed between said carriage means and said frame means to permit relative turning movement therebetween, second turntable means interposed between said frame means and said first conveying means for permitting relative turning movement therebetween, second conveying means normally being arranged in spaced relationship to said carriage means for receiving picked-up goods from said first conveying means, and third conveying means having one portion below said first conveying means for receiving picked-up goods therefrom and having another portion above said second conveying means for unloading thereonto material received from said first conveying means, movable supporting means including pivot means arranged above said second conveying means and pivotally supporting said other portion of said third conveying means, said carriage means being movable relative and substantially parallel to said second conveying means while during this movement for a certain distance that portion of said third conveying means which is above said second conveying means merely turns about said pivot means, and means operable automatically in response to a certain angular position of said third conveying means relative to said second conveying means to displace said supporting means and thereby the said other portion of said third conveying means which is above said second conveying means so as to again increase the angle between said second and third conveying means.

2. An arrangement according to claim 1, in which said carriage means forms a two-caterpillar carriage rotatable on the spot relative to said frame means.

3. In an arrangement for picking up pourable material from a storage place and conveying the picked up material: a movable loader including first conveying means and pick-up means at one portion of said conveying means and also including movable carriage means having frame means supporting said first conveying means, said frame means being fixedly connected to said carriage means, turntable means interposed between said frame means and said first conveying means for permitting relative turning movement of said first conveying means and said frame means, second conveying means normally being arranged in spaced relationship to said carriage means for receiving picked up goods from said first conveying means, third conveying means having one portion below said first conveying means for receiving picked-up goods therefrom and having another portion above said second conveying means for unloading thereonto material received from said first conveying means, movable supporting means including pivot means arranged above said second conveying means and pivotally supporting said other portion of said third conveying means, said one portion of said third conveying means being slidably supported by said frame means so as to be slidable in longitudinal direction of said third conveying means and also being adapted to carry out a certain angular movement within said frame means about said pivot means, said carriage means together with said frame means fixedly connected thereto being movable relative and substantially parallel to said second conveying means while during this movement for a certain distance that portion of said third conveying means which is above said second conveying means turns about said pivot means, and means operable automatically in response to a certain angular position of said third conveying means to displace said supporting means and thereby the said other portion of said third conveying means which is above said second conveying means so as to again increase the angle between said second and third conveying means.

4. In an arrangement for picking up pourable material from a storage place and conveying the picked up material: a movable loader including first conveying means and pick-up means at one portion of said conveying means and also including first movable carriage means having frame means supporting said first conveying means and being turnable relative to said first conveying means, second conveying means normally being arranged in spaced relationship to said carriage means for receiving picked-up goods from said first conveying means, second carriage means movable arranged above said second conveying means and provided with pivot means above said second conveying means, third conveying means having one portion below said first conveying means for receiving picked-up goods therefrom and having another portion pivotally supported by said pivot means of said second carriage means, the free end portion of said third conveying means being slidably supported by said frame means and being adapted selectively to be withdrawn therefrom, said first carriage means being movable relative and substantially parallel to said second conveying means while during this movement for a certain distance that portion of said third conveying means which is above said second conveying means turns about said pivot means, means operable automatically in response to a certain angular position of said third conveying means relative to said second conveying means to displace said second carriage means and thereby said other portion of said third conveying means so as to again increase the angle between said second and third conveying means, boom means supporting said first conveying means, suspension means supported by said boom means and adapted to support said free end of said third conveying means when the latter has been withdrawn from said frame means, and third carriage means being likewise movable above said second conveying means and adapted to receive and support said free end of said third conveying means after the latter has been withdrawn from said frame means.

5. An arrangement according to claim 1, in which said supporting means includes passage means for conveying material from said third conveying means to said second conveying means.

6. An arrangement according to claim 1, in which said frame means includes passage means therethrough for conveying material from said first conveying means to said third conveying means.

7. In an arrangement for picking up pourable material from a storage place and conveying the picked-up material: a movable loader including first conveying means and pickup means at one portion of said conveying means and also including movable carriage means having frame means supporting said first conveying means, second conveying means normally being arranged in spaced relationship to said carriage means for receiving picked-up goods from said first conveying means, third conveying means having one portion below said first conveying means longitudinally slidably supported by said frame means for receiving picked-up goods from said first conveying means and having another portion above said second conveying means for unloading thereonto material received from said first conveying means, said third conveying means being slidable in said frame means by a distance equalling at least one-third of the entire length of said third conveying means, movable supporting means including pivot means arranged above said second conveying means and pivotally supporting said other portion of said third conveying means, said carriage means being movable relative and substantially parallel to said second conveying means while during this movement for a certain distance that portion of said third conveying means which is above said second conveying means merely turns about said pivot means, a boom supporting said pick-up means and said first conveying means, and movable suspension means displaceably supported by said boom and including means for suspending said one portion of said third conveying means when the latter has been withdrawn from said frame means.

8. In an arrangement for picking up pourable material from a storage place and conveying the picked-up material: a movable loader including first conveying means and pick-up means at one portion of said conveying means and also including movable carriage means having frame means supporting said first conveying means, second conveying means normally being arranged in spaced relationship to said carriage means for receiving picked-up goods from said first conveying means, third conveying means having one portion below said first conveying means longitudinally slidably supported by said frame means for receiving picked-up goods from said first conveying means and having another portion above said second conveying means for unloading thereonto material received from said first conveying means, said third conveying means being slidable in said frame means by a distance equalling at least one-third of the entire length of said third conveying means, movable supporting means including pivot means arranged above said second conveying means and pivotally supporting said other portion of said third conveying means, said carriage means being movable relative and substantially parallel to said second conveying means while during this movement for a certain distance that portion of said third conveying means which is above said second conveying means merely turns about said pivot means, a boom supporting said pick-up means and said first conveying means, and suspension means supported by said boom and including roller means for supporting said one portion of said third conveying means when the latter has been withdrawn from said frame means.

References Cited by the Examiner
UNITED STATES PATENTS

| | | | |
|---|---|---|---|
| 2,704,149 | 3/1955 | Huey | 198—89 |
| 3,003,611 | 10/1961 | Pelzer | 198—139 X |

FOREIGN PATENTS 618,771  8/1935  Germany.

EVON C. BLUNK, *Primary Examiner.*

R. E. KRISHER, A. C. HODGSON, *Assistant Examiners.*